United States Patent [19]

MacPherson

[11] 4,005,391
[45] Jan. 25, 1977

[54] PERIPHERAL INTERRUPT PRIORITY RESOLUTION IN A MICRO PROGRAM DATA PROCESSOR HAVING PLURAL LEVELS OF SUBINSTRUCTION SETS

[75] Inventor: Alastair George MacPherson, Linlithgow, West Lothian, Scotland

[73] Assignee: Burroughs Corporation, Detroit, Mich.

[22] Filed: June 6, 1975

[21] Appl. No.: 584,359

[30] Foreign Application Priority Data

Jan. 7, 1975 United Kingdom ............... 512/75

[52] U.S. Cl. ............................................ 340/172.5
[51] Int. Cl.² ........................................... G06F 9/18
[58] Field of Search ............................... 340/172.5

[56] References Cited

UNITED STATES PATENTS

| | | | |
|---|---|---|---|
| 3,434,111 | 3/1969 | Schmidt et al. | 340/172.5 |
| 3,599,162 | 8/1971 | Byrns et al. | 340/172.5 |
| 3,836,889 | 9/1974 | Kotok et al. | 340/172.5 |

*Primary Examiner*—David H. Malzahn
*Attorney, Agent or Firm*—Mervyn L. Young

[57] ABSTRACT

A peripheral interrupt priority technique in a micro program system is disclosed which system employs two levels of subinstruction sets. The first level of subinstructions, or micro instructions, is implemented by a second level of control instructions that can be stored in a processor read-only memory. The respective micro instructions are made up of varying numbers of syllables according to the function of the particular micro instructions. The various types of micro instruction syllables are stored in a micro instruction memory to be fetched therefrom in sequence in accordance with the requirements of a particular macro instruction or subject instruction. In this manner, a variety of micro instructions can be created by selecting a plurality of different syllables from the micro instruction memory. A different control instruction syllable is provided to specify each combination of the function to be performed and the source and destination registers to be used with the particular buses in the processor.

A particular type of micro instruction is provided to control a number of data transfers within the processor and to or from memory and the input/output periphery and also to halt such data transfer upon fulfillment of a given condition. This type of micro instruction can also be employed to resolve priority of requests for service by different peripheral units, the action ending when the request having the highest priority is found.

9 Claims, 14 Drawing Figures

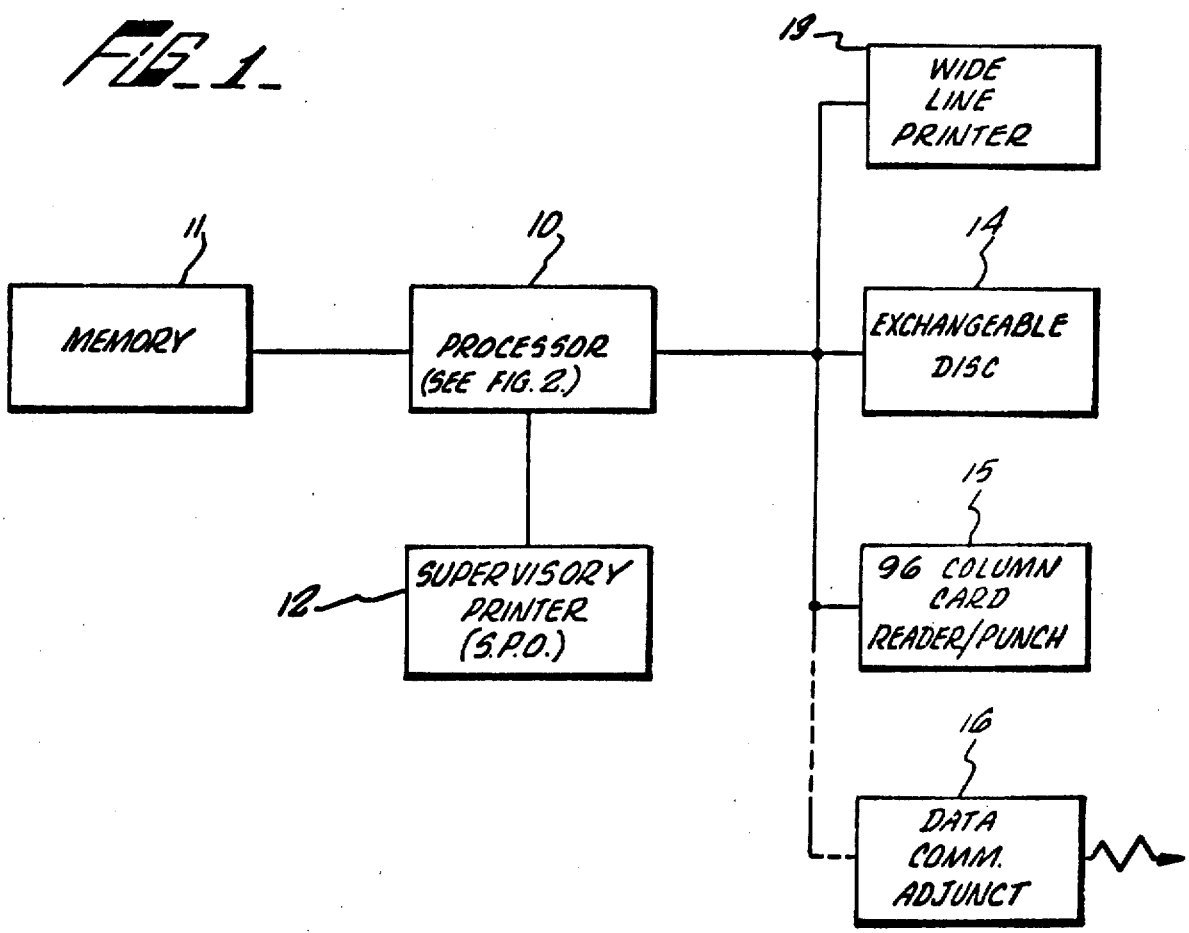
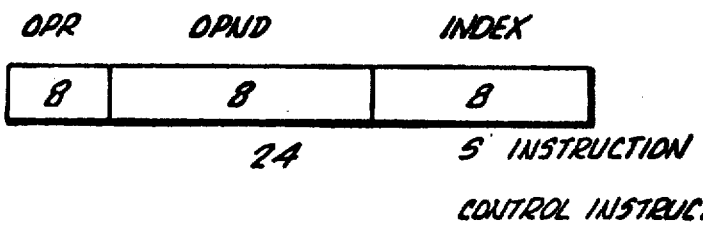
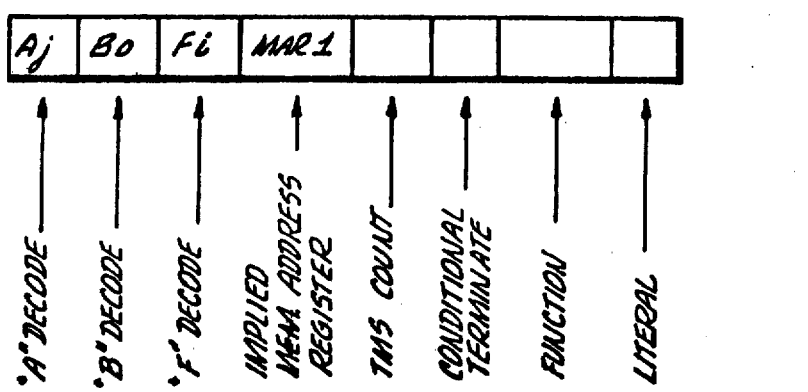

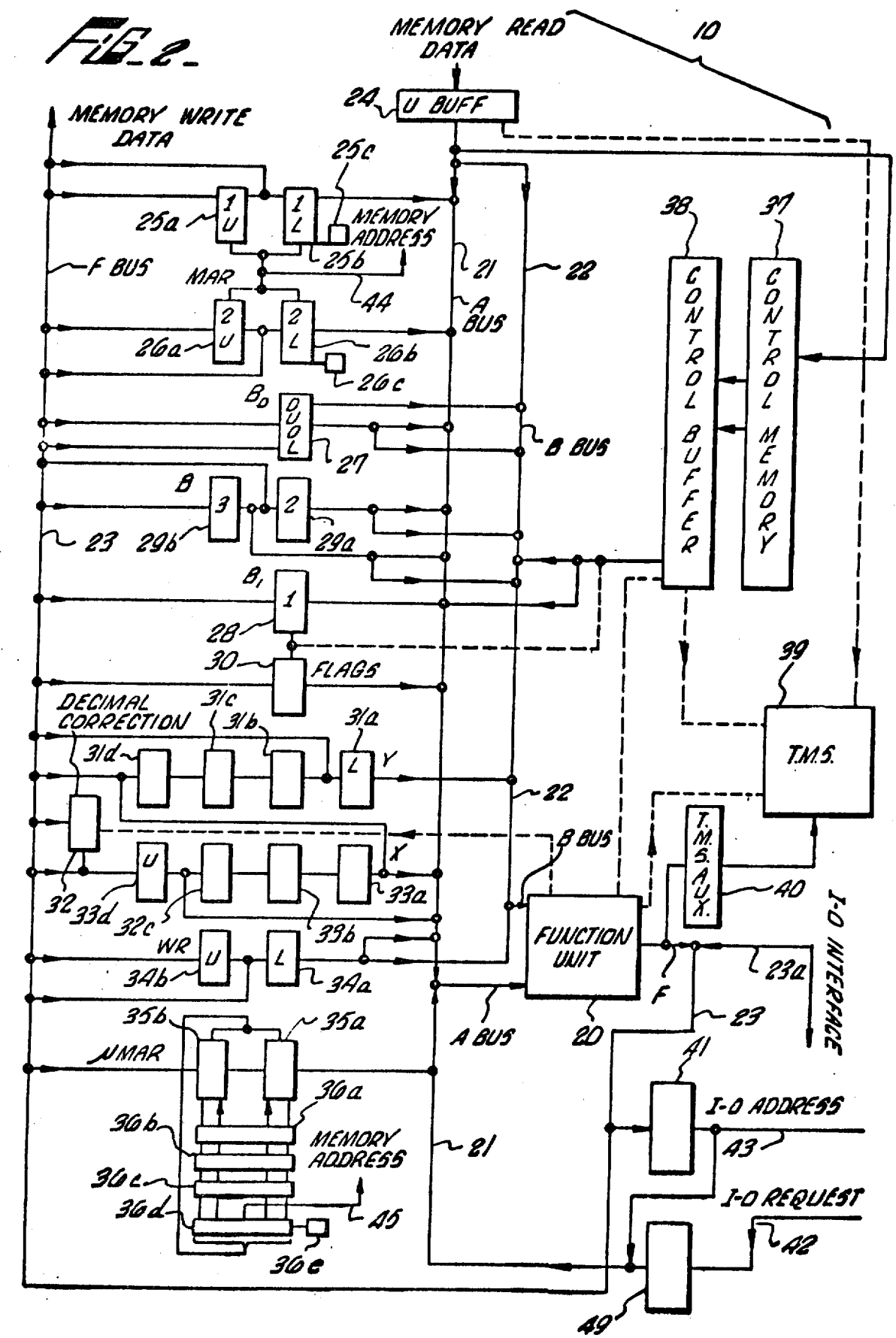

DESCRIPTOR

MICRO INSPECTION TYPES

FIG. 11

PERIPHERAL INTERRUPT PRIORITY RESOLUTION IN A MICRO PROGRAM DATA PROCESSOR HAVING PLURAL LEVELS OF SUBINSTRUCTION SETS

RELATED U.S. PATENT APPLICATIONS

U.S. Patent applications directly or indirectly related to the subject application include the following:

Ser. No. 402,724 filed Oct. 2, 1973 by A. C. Ferguson et al and titled "A Small Micro Program Data Processing System Employing Multi-Syllable Micro Instructions" now U.S. Pat. No. 3,930,236.

Ser. No. 402,747 filed Oct. 2, 1973 by A. C. Ferguson et al and titled "A Micro Program Data Processor Having Parallel Instruction Flow Streams For Plural Levels of Subinstruction Sets" now U.S. Pat. No. 3,886,523.

BACKGROUND OF THE INVENTION

1. Field of Invention

This invention relates to a small data processing unit for business and communications applications and more particularly to a small micro program processing unit having a micro instruction controlled peripheral interrupt request resolution.

2. Description of the Prior Art

Many business enterprises do not always have sufficient data processing requirements to justify the employment of a full-scale general purpose data processing system. Often the requirements of such companies can be fulfilled by electronic accounting and billing machines which can be considered to be small special purpose computers. On the other hand, such small special purpose computers, as existed in the prior art, are too limited in capability to accept programs that have been written in the so-called higher level program languages.

An alternative method of handling data processing requirements of small or medium sized enterprises is that of having on-site remote terminals which are coupled to a distant large scale data processing system in a time-sharing manner. In many instances, the data processing requirements of a particular business will be a mix of accounting and billing tasks, and also of other processes which require a large computational capability. To meet this situation terminal processors are provided which not only allow for the time-sharing of a larger computer, but which are also capable of performing specific processing routines. In the case of terminal processors, as well as small business processors, emphasis is placed on the cost of the system so as to make the system available to a wide variety of smaller companies. In the past, this has limited the ability of the user to move to full-scale general purpose data processing systems, as such a system's change has required the conversion of the user's previous programs to the more flexible languages for which the larger system is adopted.

In the past, the lack of program compatability existed to some degree between systems from the same manufacturing source, but was even more acute between systems built by different companies, since different designers employ different instruction formats which differ in length; and also employ different field sizes within the instruction format. To overcome such differences in "machine languages", a variety of different higher level programming languages were developed, among the more common of which are FORTRAN, COBOL and ALGOL. Programs written in such programming languages could be encoded and used in different computer systems; however, such programs had to first be translated into the machine language of the particular system which translation was performed by a systems program sometimes called a compiler, and if such a compiler had not been provided for a particular programming language, then the computer user would have to rewrite his program in a language for which the system did have a compiler.

A particular manner that may be employed to readily accomodate programs written in different higher level languages has been that of micro programming. At one time, micro programming was considered as an engineering design tool whereby the machine instruction wired decoder was replaced by a table look-up memory containing various sets of control signals as required to condition the various gates and registers for data transfer as specified by the machine language instruction. In this manner, the machine language instruction was executed by sequencing through a plurality of locations in the table look-up memory. In more sophisticated processors, the number of gates and registers involved are increased in number with a proportionate increase in the number of control signals to be stored and a resultant increase in the size and cost of the table look-up memory. In order to reduce the size of the table look-up memory, the respective sets of control signals are encoded in binary code to become what is generally referred to as micro operators or micro instructions that are then decoded by a wired decoder which, nevertheless, is less expensive than a wired decoder required for a machine language instruction.

The wide use of large-scale integrated circuitry has made it practical to implement the micro instruction memory as a read-write memory. This, in turn, allows the particular sets of micro instructions stored in that memory to be dynamically changed so as to free the processor from limitations upon its functions and capabilities. With such variable micro programming, the processor is not restricted to one particular machine language or subject instruction format. Since no one subject instruction format is preferred, that format can now be chosen in accordance with any program requirement. This, in turn, provides a small data processor that can be dynamically changed to accommodate a complete spectrum of applications from scientific to business including accounting and billing. One of the few remaining restrictions on the system adaptability is the number of input/output or peripheral channels the system can accommodate.

It is, then, an object of the present invention to provide an inexpensive data processor that can nevertheless accommodate a plurality of peripheral channels.

It is another object of the present invention to provide a micro program data processor requiring a relatively simple and inexpensive peripheral interrupt priority resolution.

It is still another object of the present invention to provide a micro program data processor having a plurality of channels, the interrupt priority of which can be readily and flexibly changed.

SUMMARY OF THE INVENTION

To achieve the above-described objects, the present invention resides in the system, and the method employed in that system, which includes a micro program processor that is driven by micro instructions made up of varying numbers of syllables, depending upon the function and literal values required. The processor employs two levels of subinstruction sets by which macro or subject instructions are implemented by strings of micro instructions all of which are in turn implemented by control instructions. Each level of instruction sets may be stored in separate portions of memory, or even separate memories, with the control instructions being stored in a read-only memory internal to the processor.

A feature of the present invention resides in a programmable processor employing two levels of subinstruction sets whereby macro or subject instructions are implemented by strings of micro instructions, all of which are, in turn, implemented by control instructions. Priority resolution of peripheral interrupt requests are serviced by one micro instruction which sequentially causes different ones of sets of signals to be generated for comparison with all of the received incoming request lines. Each set of signals contains only one positive signal. The order of a signal in each set of signals represents the priority of corresponding request line. The micro instruction servicing the interrupt request continues calls for the sequence of sets until a comparison is achieved, at which time the sequence is halted and the corresponding request line is serviced.

DESCRIPTION OF THE DRAWINGS

The above and other objects, advantages and features of the present invention will become more readily apparent from a review of the following specification when taken in conjunction with the drawings wherein:

FIG. 1 is a schematic diagram of a system employing the present invention;

FIG. 2 is a schematic diagram of the processor of the present invention;

FIG. 3 is an illustration of the typical S-instruction format, as employed in the present invention;

FIG. 6 is an illustration of the format of a control operator, or control instruction;

FIG. 11 is a timing diagram of micro instruction fetch operation without parallelism for comparison with FIG. 10; amd

GENERAL DESCRIPTION OF THE SYSTEM

Figure 4:
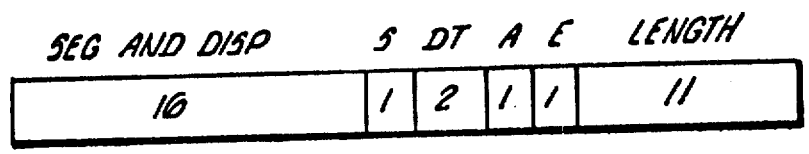
FIG. 4 is an illustration of a typical data descriptor format, as employed in the present invention.

As was described in the above background, objects and summary of the present invention, the present application is directed toward an inexpensive system to fulfill the requirements both of electronic accounting and billing machine markets, and also the markets for a small general purpose data processing system. More specifically, however, the system of the present invention is designed to accommodate programs written in higher level programming languages, such as COBOL. To this end, the system of the present invention is a micro program system wherein such higher level program language instructions are interpreted by strings of micro instructions. In order to reduce the cost of the micro instruction decoder and also to provide greater flexibility for micro instruction execution, the respective micro instructions are in turn implemented by control instructions which comprise sets of signals as required to condition the various gates and registers for data transfer. To further reduce the cost of the system, that system is adapted to accommodate micro instructions of variable numbers of basic micro instruction syllables, which syllables may be transferred sequentially, thereby reducing the necessity for large data path widths in the processor and processor-memory interface.

The system of the present invention is one which is controlled by micro instructions that are, in turn, implemented by control instructions. That is to say all data moves are executed under the control of control instructions that have been called for by micro instructions.

Since the variable length micro instructions are to be made up of syllables including an operation code and different literal values, the system of the present invention is adapted to store the respective syllables with the desired micro instructions being formed by fetching the appropriate syllables in sequence from the micro program memory. This technique achieves code compaction in the micro store and eliminates redundancy.

The micro programmer is allowed to choose the respective micro operation code syllables, as required to specify source and destination registers, as well as function to be performed.

Micro instruction fetch is overlapped with micro instruction execution. This parallelism reduces the time required for execution of the various strings of micro instructions. Furthermore, the overlap in micro instruction fetch and execution serves to close up the ranks of the instruction flow stream, as does a micro instruction specifying transfer of the number of data segments (up to 256 bytes) within the processor and to and from memory, or the input/output periphery. Data streaming described by one micro instruction minimizes the number of micro instructions to be executed for a given data field.

A system which may employ the present invention is illustrated in FIG. 1, which may be a small, but nevertheless a programmable, general purpose data processing system. As illustrated in FIG. 1, a system includes processor 10 which is adapted to communicate with memory 11 and supervisory printer 12, as well as a host of peripherals including line printer 13, disk 14, card reader-punch 15 and even data communication controller 16 through a common interface to each peripheral unit.

The processor of the present invention is illustrated in FIG. 2 which will now be briefly described. As illustrated therein, the processor is formed of function unit 20 to which data is supplied by A bus 21 and B bus 22 and from which data is received by way of F bus 23. All data moves from the various registers through function unit 20. These respective buses are eight bits wide, which is the basic width of all syllables and data segments employed in the system. A bus 21 and B bus 22 receive information segments from the respective registers, and also from memory by way of U buffer register 24, which is also employed to supply eight-bit addresses to control memory 37. F bus 23 is coupled to input/output interface 23a, input/output address register 41, as well as to the respective registers as will be more thoroughly described below.

As was indicated above, machine instructions or S-instructions (which may be a higher level program language) are implemented by strings of micro instructions which are stored in main memory 11 of FIG. 1. The S-instructions and other data are also stored in memory 11. To this end, the respective instructions and data may be stored in different portions of a single read-write memory. However, in the preferred embodiment of the present invention, memory 11 of FIG. 1 is divided into separate portions (not shown) with a read-write portion being provided for S-instructions, some micro instructions and data, and a read-only portion being provided for the permanent storage of micro instructions to provide "bootstrap" facilities.

As was further indicated above, respective micro instructions are implemented by control instructions stored in control memory 37, which is internal to the processor, as indicated in FIG. 2. The control memory 37 may be an integrated circuit read-write memory. However, in the embodiment of the present invention, control memory 37 is a read-only memory.

The format of a typical S-instruction is illustrated in FIG. 3. The format as illustrated therein might consist of an eight-bit operator field, an eight-bit operand field, and an eight-bit index field. The contents of this operand field may be used to address a descriptor, which, in turn, can be combined with a similarly derived index to create an address to data in memory. The format of such a descriptor is illustrated in FIG. 4, and may include a sixteen-bit field specifying segment and displacement to define the location of the first data segment in the block of data being addressed, a one-bit field to specify whether the data is, for example, in ASCII or EBCDIC code, a one-bit field to specify the sign for four-bit numeric data and an 11-bit field to specify the length of data block being accessed.

Figure 5A:
FIGS. 5a, 5b and 5c are illustrations of the format for different types of micro instructions.

As was described above, the S-instructions are implemented by strings of micro instructions. In the present invention there may be three types of micro instructions whose formats are illustrated respectively in FIGS. 5a, 5b and 5c. FIG. 5a represents a type I micro instruction, which is a single character that "maps" on a one-to-one basis into control operators. In essence, this single character is an address to the control memory of the processor to select the respective control instruction that describes the functions associated with processor-memory, processor-input/output and the inter-processor transfers. A typical micro instruction of this type might be COPY MAR1 → MAR2.

Figure 5B:
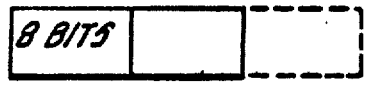

FIG. 5b illustrates a type II micro instruction which is a multiple character micro instruction having a literal value "in-line" in micro memory 11 in which the literal value follows the eight-bit operator field or first character. The operator field of this type of micro instruction maps directly into a control operator to select data path execution count, functions and so forth, the length of the in-line literal being described by the execution count.

Figure 5C:
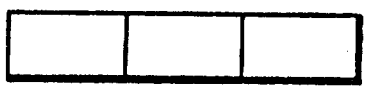

FIG. 5c illustrates a type III micro instruction which is a three character micro instruction used for jumps and subroutine jumps. The first eight bits describe the control operator associated with the micro instruction and the following two in-line characters represent the address parameters.

The first character, or operator field, of the various micro instructions is an address to the control memory to specify the location of a corresponding control instruction. The format of such a control instruction will now be described in reference with FIG. 6. As is illustrated therein that the control instruction contains a number of fields. The A decode field is a five-bit field describing the data path inputs to the A bus (21 in FIG. 2). The B decode field is a five-bit field describing the data path inputs to the B bus (22 of FIG. 2). The F decode field is a five-bit field describing the data path output from the F bus (23 of FIG. 2). The implied memory address field, of the format of FIG. 6, is a two-bit field to select an address register for addressing memory which selection may be MAR1 register 25 in an increment or decrement mode or MAR2 register 26 also in an increment or decrement mode (all registers and buses being shown in FIG. 2). The TMS load field, in FIG. 6, is a four-bit field to perform automatic execution count time selection for standard micro instructions. The conditional terminate field is a one-bit field to select conditional exits from micro instruction execution. The function field is a five-bit field to select arithmetic or logical operations in function unit 20 of FIG. 2. The literal field is an eight-bit field to permit literal values to be extracted from control instructions.

The type I micro instruction (one character) can specify one of 256 unique control operators. Type II and type III micro instructions allow extension parameters to be provided by in-line literals in those micro instructions. The existence of dual timing machine state controls permit use of the TMS auxiliary register (40 in FIG. 2) to augment a micro instruction set by associate count times loaded by a previous micro instruction with existing control operators.

As was previously described, the system of the present invention is controlled by micro instructions that are, in turn, implemented by control instructions. That is to say all data moves are executed under the control of control instructions that have been called for by micro instructions. Since respective micro instructions might be made of a different number of syllables which must be fetched in sequence, the time required for fetching the variable syllable micro instruction itself varies as specified in the count field of the control instruction. Machine state control 39 in FIG. 2 can specify one of eight different machine states, including two delay states, which are used in conjunction with the count fields of the control instructions to fetch micro operators and variable syllables. To this end, machine state control unit 39 is provided with a four-bit counter (not shown) to designate the micro instruction execution time. This counter is loaded from the count field of the control instructions.

To accommodate the extended data transfers to or from peripheral devices, and to and from memory, auxiliary machine state counter 40 is an eight-bit counter to specify up to 256 such data transfers. Up to 256 data segments thus can be transferred under the control of a single micro instruction. This feature might be employed, for example, in the compare operation to search a string of data segments for a particular value and the processor is adapted to conditionally halt the execution of that micro instruction should a compare have been achieved. It is this particular feature which is employed by the present invention to call the sequence of sets of signals representing the priority in which peripheral interrupt requests are to be serviced.

In order to reduce the time required for the execution of a number of micro instructions, micro instruction fetch is overlapped with micro instruction execution. A first-in, last-out push down stack (36a-d in FIG. 2) is provided to hold a series of micro memory addresses to expedite the fetching of jump or subroutine micro instructions.

DETAILED DESCRIPTION OF THE SYSTEM

As was described above, the system of the present invention was designed to provide for the flexible choice of language structures and input/output mechanisms, which system is nevertheless sufficiently free of fixed wired circuits so as to be competitive in cost with small special purpose and general purpose computers. In order to provide a more detailed description of the present invention, the system will now be described with reference to the drawings.

FIG. 2, as generally described above, is a diagram of the processor of the present invention. As shown therein, memory address registers 25 and 26 (MAR1 and MAR2 respectively) are identical sixteen-bit registers which operate in one of two modes: transfer and count. In the transfer mode, each register is arranged as two eight-bit byte registers (25a, 25b and 26a, 26b respectively) both capable of being loaded from function unit 20 by way of F bus 23. Each pair of byte registers can be concatenated into a two-byte register loaded from F bus 23. When in the transfer mode, and with no valid address loaded, a memory address register may be used as a general purpose register. When in the count mode, each of the memory address registers is employed to address memory. Memory address bus 44 is a sixteen-bit bus provided for this purpose. This allows up to 64K bytes of memory to be addressed. In the count mode, a memory address register (25 and 26 in FIG. 2) may be commanded to increment or decrement. The increment facility (25c and 26c in FIG. 2) is used to address sequential characters within memory, and the decrement facility mainly to address arithmetic information for correct presentation to processor.

B0 register 27 is a single character general purpose register comprising two sections OU and OL to provide both byte and digit capability. In the digit mode, each digit may be combined with another digit in accordance with any function to be performed by function unit 20. In the byte mode, both digits in B0 register 27 may be unloaded to or loaded from function unit 20.

B1 register 28 is a single character register with bit making facilities controlled by a literal value from control memory 38, and providing the capability of jump micro instructions on any bit in register 28, set or reset. In the transfer mode, the B1 register may be unloaded into function unit 20 and loaded from function unit 20. B2 register 29a and B3 register 29b are single character general purpose registers which may be concatenated to form two-byte register 29. Each of the separate registers may be unloaded to function unit 20 and load from function unit 20.

WR register 34 is a general purpose working register with two modes of operation: transfer and bit. In the transfer mode, the WR register is arranged as two eight bit byte registers (34a and 34b) each capable of being loaded from function unit 20. However, only lower byte register 34a can be unloaded to function unit 20. In the bit mode, WR register 34 is internally connected as a sixteen-bit serial shift register with shift off and recirculate capability. The shift amount is conditioned by a literal value placed into the controlling machine state counter, either the normal counter within the machine state control unit 39 or auxiliary machine state counter 40.

Flag register 30 is a single character register used as storage for a general flags byte. Bit setting is controlled by a literal value from control memory 37.

In the transfer mode, register 30 may be unloaded to function unit 20 or may be loaded from function unit 20.

X registers 33a, 33b, 33c and 33d and Y registers 31a, 31b, 31c and 31d may be respectively concatenated together to form two four-byte registers, or may be concatenated together to form one eight-byte or sixteen digit register (XY). The respective registers may be loaded from function unit 20 and each unloaded to function unit 20. When employed in relation with function unit 20, these registers may perform decimal arithmetic. When in the digit mode, the XY combination of registers may be used for a zone stripping and appending.

Micro memory address registers 35a and 35b are a series of two one-byte registers capable of being loaded from or unloaded to function unit 20. These registers can also supply information to, and receive information from, three sixteen-bit registers 36a, 36b and 36c, which are arranged to form a push down or last in-first out (LIFO) address stack for addressing micro memory and storing program and interrupt subroutine addresses. Sixteen-bit counter 36d is also provided with increment capability and may be loaded directly from registers 35a and 35b. Micro memory address bus 45 is a sixteen-bit bus to receive addresses from stack register 36c and also from counter 36d. Counter 36d is coupled to increment unit 36e to provide increment capability.

TMS auxiliary register 40, which was briefly described above, is a single character register with two modes of operation: load and decrement. In the load mode, this register may be loaded from function unit 20. Control for the next succeeding micro instruction is transferred to this register from machine state counter in TMS control unit 39. In the decrement mode, TMS auxiliary register 40 controls the termination of the current micro instruction execution if preconditioned by a load TMS auxiliary micro instruction.

Input/output address register 41 is an eight-bit register used to address eight bi-directional input/output channels or control units. This register may be loaded from function unit 20 and may unload to function unit 20.

Function unit 20 consists of two arithmetic logic units having the functional capability listed below. The function unit data paths are eight bits wide in conformance with the data path width of the widths of the input and output buses (A bus 21, B bus 22 and F bus 23). The table below lists the resultant output F as a function of the two inputs A and B. Additional functional capabilities such as decimal (BCD) arithmetic, tens' complement, and zone appending are provided by data path selection and the use of micro instruction literals.

| CONTROL CODE | FUNCTION |
| --- | --- |
| 11111 | TRANSFER A |
| 00001 | INVERT A |
| 10111 | LOGICAL 'AND' A.B |
| 11101 | LOGICAL 'OR' A + B |
| 01101 | EXCLUSIVE 'OR' A⊕B |
| 10010 | BINARY ADD A PLUS B |
| 00000 | BINARY INCREMENT A |
| 11110 | A MINUS 1 |
| 01100 | A MINUS B MINUS 1 |
| 00100 | (A + B̄) |
| 00111 | ZERO |
| 00011 | A + B |
| 00101 | Ā - B |
| 01001 | A.B |
| 01011 | B̄ |
| 01111 | A.B̄ |
| 10001 | Ā + B |
| 10011 | A⊕B |
| 10101 | TRANSFER B |
| 11001 | 1 |
| 11011 | A + B̄ |
| 00010 | A + B |
| 11010 | (A + B) PLUS A |
| 00110 | MINUS 1 |
| 01000 | A MINUS A.B |
| 01010 | (A + B) PLUS A.B̄ |
| 01110 | A.B MINUS 1 |
| 10000 | A PLUS A.B |
| 10100 | (A + B̄) PLUS A.B |
| 10110 | A.B MINUS 1 |
| 11000 | A PLUS A |
| 11100 | (A + B̄) PLUS A |

The portion of the processor described therefore includes the register organization and the function unit. A detailed description will now be provided for the micro instruction decode organization which includes U buffer register 24 and control memory 37, as well as the machine state control unit 39, as illustrated in FIG. 2.

U buffer register 24 is an eight-bit register used for addressing control memory 37 and for providing information about the next micro instruction to be executed. This information is required to generate overlap of the micro instruction fetch and execution phases. Upon the accessing of control memory 37, a control instruction is supplied to control buffer register 38. As was generally described above, the contents of control buffer 38 (that is to say, the control instruction) controls the selection of the source and destination registers and the function to be performed.

Machine state control unit 39 controls the phasing of all micro instructions in the processor. (The respective machine states are more thoroughly described below). A look-ahead technique is employed in the micro instruction decode as is overlap of the fetch and execution phases of the micro instruction execution. The look-ahead function involves a decision on the current micro instruction machine state and count time, the type of the current micro instruction obtained from the control instruction from the control memory, and the type of the next micro instruction contained in U buffer register 24, if the contents of that register have been declared valid, i.e. a micro operator syllable is present. The machine state during the next count time of the processor is computed and decisions are made on whether to address memory and request memory access, to fetch the next micro instruction and increment the micro memory address register, and to declare the contents of the U buffer register 24 to be valid. As was indicated above, machine state control unit 39 includes a four-bit counter (not shown) which is preset from the control instruction and controls the number of execution periods for the current micro instruction (except when TMS auxiliary register 40 has been enabled by the previous micro instruction).

The TMS auxiliary register 40 is employed to control the transfer of a number of the data segments (up to 256 bytes) under the control of a single micro instruction. Such multi-segment transfers may be to or from main memory 11 of FIG. 1, or to or from the input/output periphery. Furthermore, a conditional terminate micro instruction is provided under which the data string being transferred is scanned for comparison with the value of the contents of one of the data registers and, should a comparison occur, the micro instruction terminates and machine state control is transferred back to the four-bit counter (not shown) in machine state control unit 39.

Figure 7:
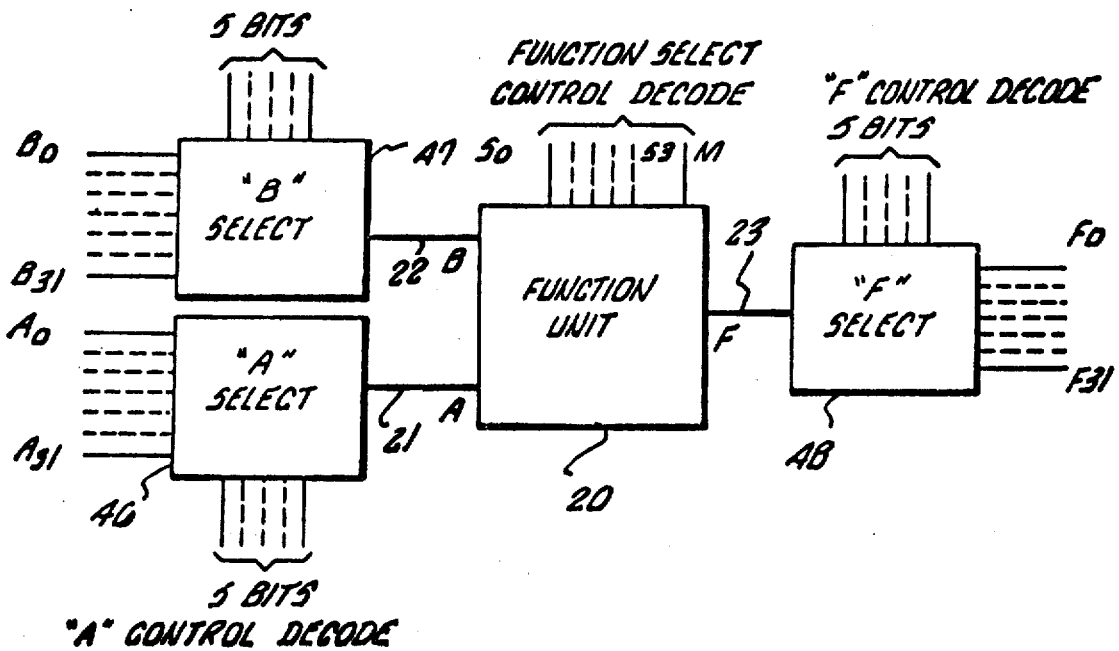
FIG. 7 is a schematic diagram of the data select networks for the various data registers of the present invention.

The manner in which a control instruction selects the individual source and destination registers, as well as the function to be performed, will now be described in relation to FIG. 7, which is a schematic diagram of the A, B and F select networks. As was described above, the control instruction contains three five-bit fields to specify respectively the register to be coupled to the A bus 21 (see also FIG. 2), the register to be coupled to the B bus 22 and the register to be coupled to the F bus 23. In addition, the control instruction contains a five-bit field to specify the arithmetic or logic operation to be performed by function unit 20. These respective fields are received by control buffer 38 of FIG. 2, and are transferred to the respective select networks as illustrated in FIG. 7. The A decode field is transferred to the A select network 46 to connect the particular specified register to A bus 21. The B decode field is transferred to the B select network 47 to connect the particular specified register to B bus 22 and the F control field is transferred to the F select network 48 to specify which register is to be coupled to F bus 23. The function select decode field is transferred directly to function unit 20. All of the fields may be selected independently of each other.

The manner in which the various micro instructions and control instructions are fetched in an overlap manner will now be described in relation to FIG. 9 which is a series of related wave forms representing the sequence of steps that are performed at different corresponding units of the system. Related steps at such different units as required to decode and execute each micro instruction are designated by the same numeral in each of the wave forms so that the history of the decode and execution of each particular micro instruction can be obtained by tracing the related numerals down through the various wave forms.

Figure 9:
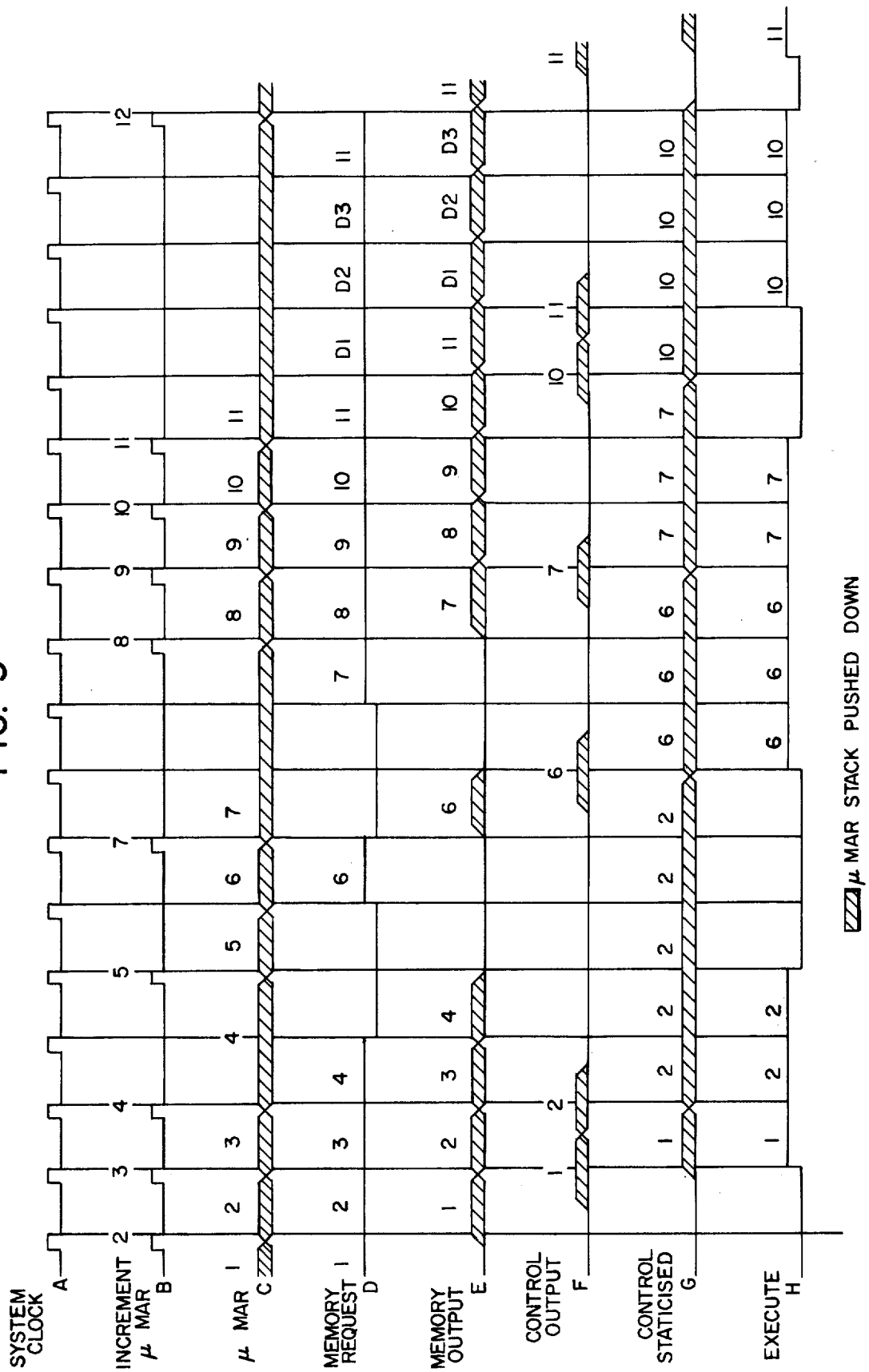
FIG. 9 is a set of wave forms illustrating the timing of the micro instruction fetch and execute cycles through a number of machine states.

In FIG. 9, wave form A merely represents the system clock and is illustrated primarily to provide a timing reference for the other signals. Wave form B is a representation of the time when the micro memory address register (including its counter) is incremented to provide a new address for the micro memory. Wave form C is a representation of the times when the micro memory address register is denoted as containing a valid micro memory address. Wave form D is a representation of the times when a memory address is presented to the memory to fetch data or micro instructions which micro instructions are stored in the micro portion of main memory in the preferred embodiment of the present invention. Wave form E is a representation of the times when an output is received from main memory of either data or micro instructions. Wave form F is a representation of the times when an output is received from the control memory (37 in FIG. 2) due to that control memory having been addressed by a micro instruction operation code. Wave form G is a representation of the times when control buffer 38 of FIG. 2 has been staticized or set by the output of control memory 37. And wave form H represents the times during which the signals from control buffer 38 are employed to cause the execution of the particular functions and data transfers called for by the corresponding micro instruction. The closed cross-hatched areas in the various wave forms represent times when micro memory address register stack 36 is pushed down to store additional micro memory addresses.

The fetch, decode and execution steps of various types of micro instructions are illustrated in the respective wave forms of FIG. 9 which steps are related to the total steps required for execution of each of the particular micro instructions. Related steps bear the same numerical designation, which numerical designations will now be described. Numeral 1 indicates the various steps required for a single count time micro instruction not employing a memory fetch (other than to fetch the micro instruction). Numeral 2 represents the various steps required for a subroutine jump micro instruction fetch. Numeral 3 represents a memory fetch of the first byte of a jump address as required by the subroutine jump micro instruction. Numeral 4 represents the memory fetch of the second byte of a jump address. Numeral 5 represents the set up of a subroutine return address. Numeral 6 represents a three-count time non-memory fetch micro instruction. Numeral 7 represents a micro instruction having a two-character literal. Numeral 8 represents the memory fetch of the first byte of that literal. Numeral 9 represents the memory fetch of the second byte of that literal. Numeral 10 represents a three-character memory read micro instruction fetch. Numeral 11 represents the actual memory accessing to fetch the three characters. D1, D2 and D3 represent the actual receipt from memory of the first, second and third bytes representing those characters.

The various wave forms of FIG. 9 have been illustrated and described primarily to demonstrate the overlapped relation between the fetch (wave form E) and execution (wave form H) of successive micro instructions, and also to demonstrate the employment of the push down stack (36a–d in FIG. 2) to hold successive micro memory addresses. However, the wave forms of FIG. 9 also demonstrate other features of interest. For example, while the fetch of a subroutine jump micro instruction (numeral 2) is implemented by control instructions (wave form H) from the control memory, the fetching of the two bytes of the jump address (numerals 3 and 4) is under control of that micro instruction and additional control memory output (wave form F) is not required. Similarly, the setup (wave forms B and C) of the subroutine return address (numeral 5) does not require control memory output (wave form F). In a like manner, the fetch of a two-character literal micro instruction, type III micro instruction (numeral 7), requires a control memory output for one clock time; however, the subsequent fetch of the two-bytes of the literal (numerals 8 and 9) do not require control memory output, since that fetch is under control of the previously fetched micro instruction. In a like manner, the fetching of data characters from main memory (numeral 10) does not require a control memory output once the micro instruction calling for that output has been placed in execution.

The overlap in micro instruction fetch and execute is clearly indicated in FIG. 9. For example, the execution of the first micro instruction (Numeral 1) is carried out during the third clock period at the same time that the second micro instruction is being fetched from memory, the address of the second micro instruction having been stored in the push down stack during the memory fetch of the first micro instruction. Correspondingly, the execution of the three-count time non-memory access micro instruction (Numeral 6) is carried out during successive clock times during which the two-character literal micro instruction is being fetched from memory.

Figure 10:
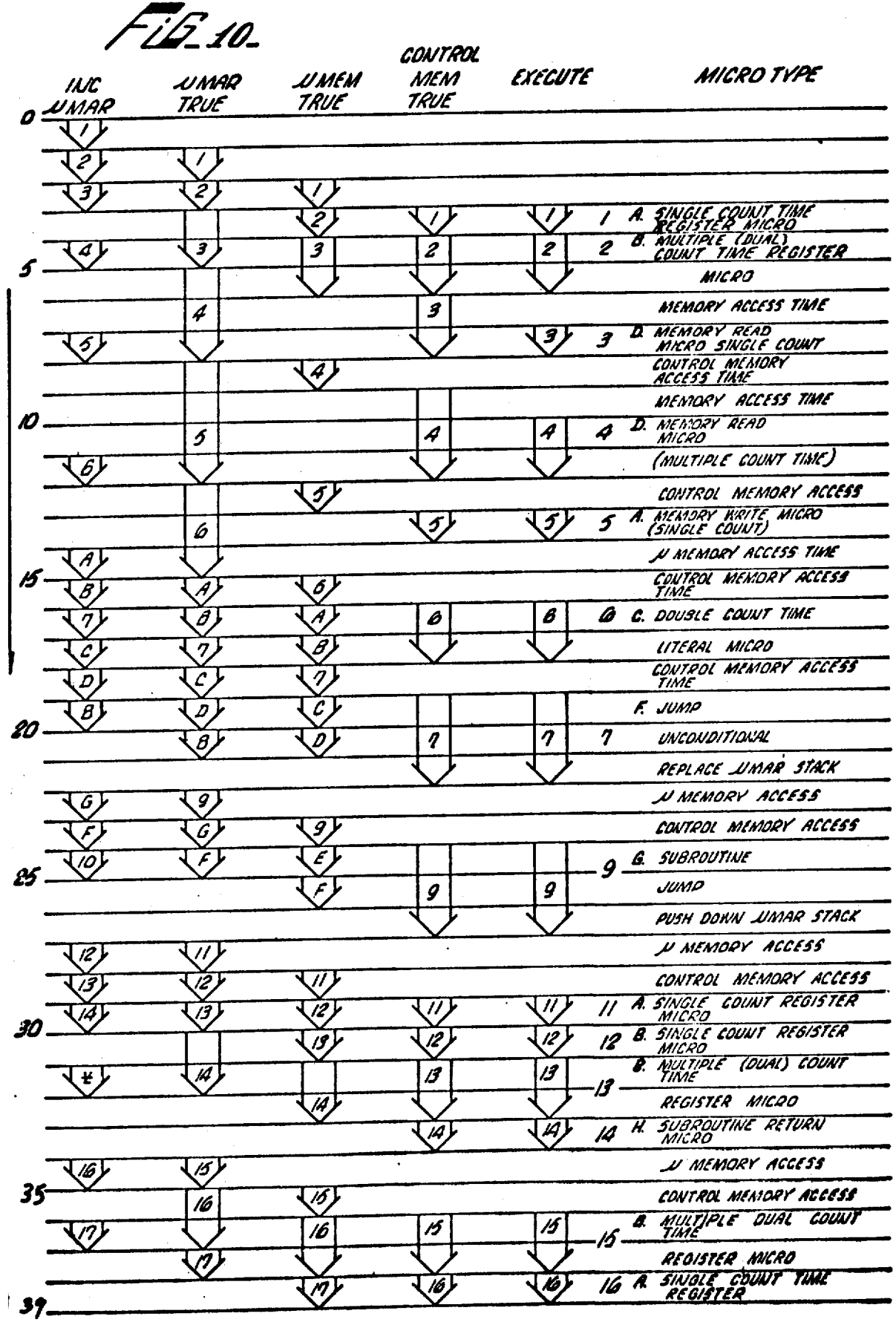
FIG. 10 is a timing diagram illustrating the parallelism of overlapped fetch of micro instructions, as employed in the present invention.
Figure 11:
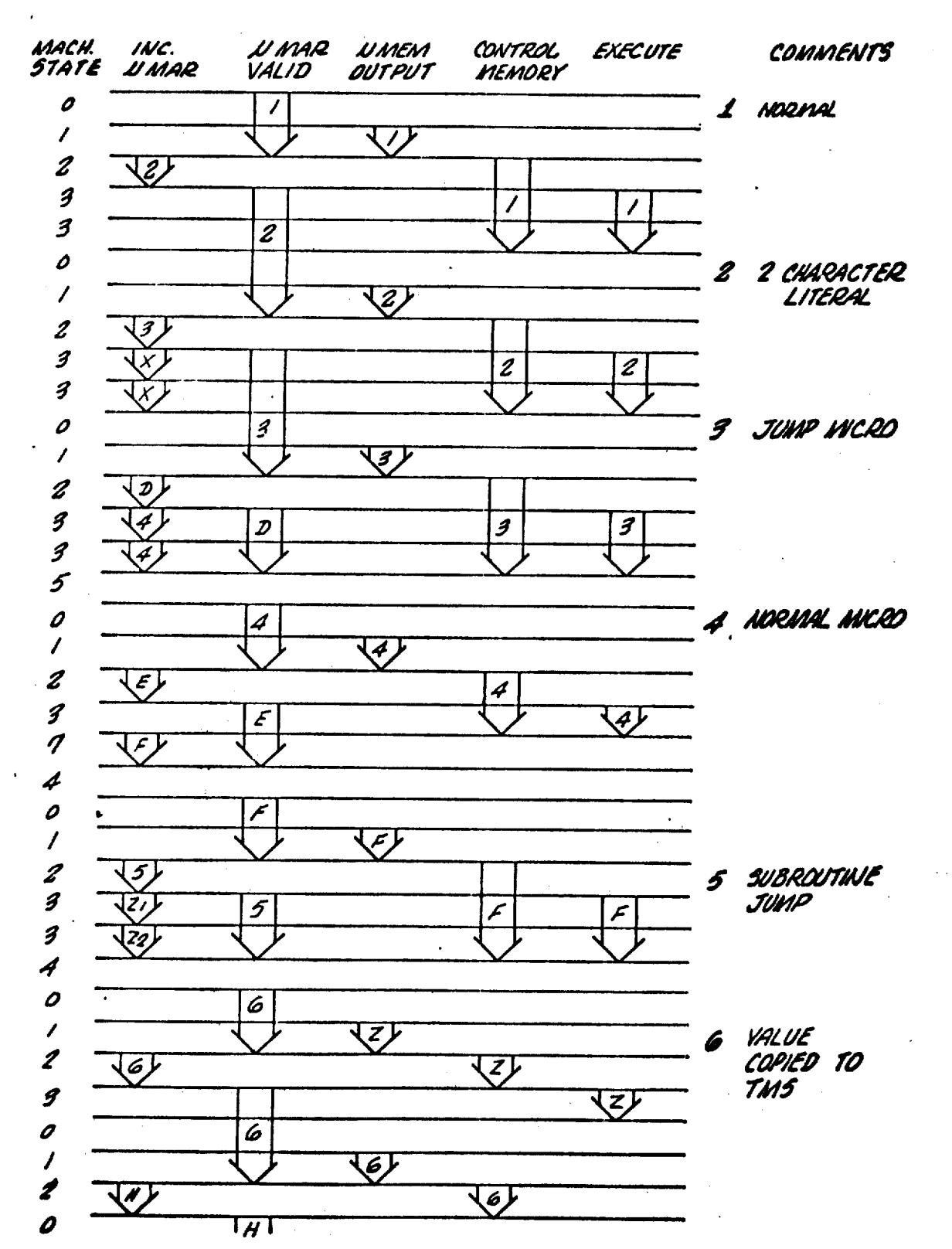

Perhaps a more dramatic demonstration of the overlapped fetch and execution can be achieved from a comparison of FIGS. 10 and 11, wherein FIG. 10 is a timing chart illustrating the thorough parallelism of micro instruction fetch, as well as micro instruction execution, for a number of different types of micro instructions. For comparison, FIG. 11 is a similar timing chart where there is parallelism or overlap between micro memory address incrementation and micro instruction execution, but there is no overlap between micro memory fetch and the micro instruction execution. That is to say in FIG. 11 there is no overlap between micro instruction fetch from the micro portion of main memory and control instruction fetch from the control memory.

As illustrated in FIG. 10, the present invention allows for parallelism or overlap between the incrementation of the micro memory address register and the presentation of the contents of that register to the micro memory for successive instructions; parallelism or overlap between the presentation of a micro memory address to the micro memory and also a fetch from micro memory for successive instructions; and parallelism between the fetching of a micro instruction from micro memory and the fetching of a control instruction from control memory for successive instructions. Such parallelism or overlap may be viewed as creating a "pipeline" effect of fetching succeeding micro instructions while the previously fetched micro instructions are being pushed further through the pipeline toward the control instruction buffer for execution.

In this manner, the incrementation of the micro memory address, accessing micro memory, receiving the micro memory fetch, receiving the control memory fetch and execution for a single count time register transfer micro instruction requires but four clock times with the parallelism of the present invention. However, as illustrated in FIG. 11, such normal micro instruction would require six clock times. Other savings required in the number of clock times required for fetch and execution of the various types of micro instructions may be gleaned from other comparisons of FIGS. 10 and 11, which savings are achieved due to the fact that the incrementation of the micro memory address to achieve the next address is not delayed due to a micro memory fetch for the previous address, and that the micro memory fetch is not delayed by a control memory fetch for the previous micro instruction.

As was described above in regard to the micro instruction execution organization, machine state control unit 39 (see FIG. 2) controls the phasing of all micro instructions in the processor. As was further described above, a look-ahead technique is employed which involves a decision on the current micro instruction machine state count time, the type of the current micro instruction obtained from the state machine decode field in the control instruction, and the type of the next micro instruction contained in U buffer register 24 (see FIG. 2) as received from micro instruction memory. The machine state during the next count time of the machine is computed and decisions are made on whether to address memory and request memory access, to fetch and next micro instruction and increment the micro memory address register and to declare the U buffer register valid.

Figure 8:
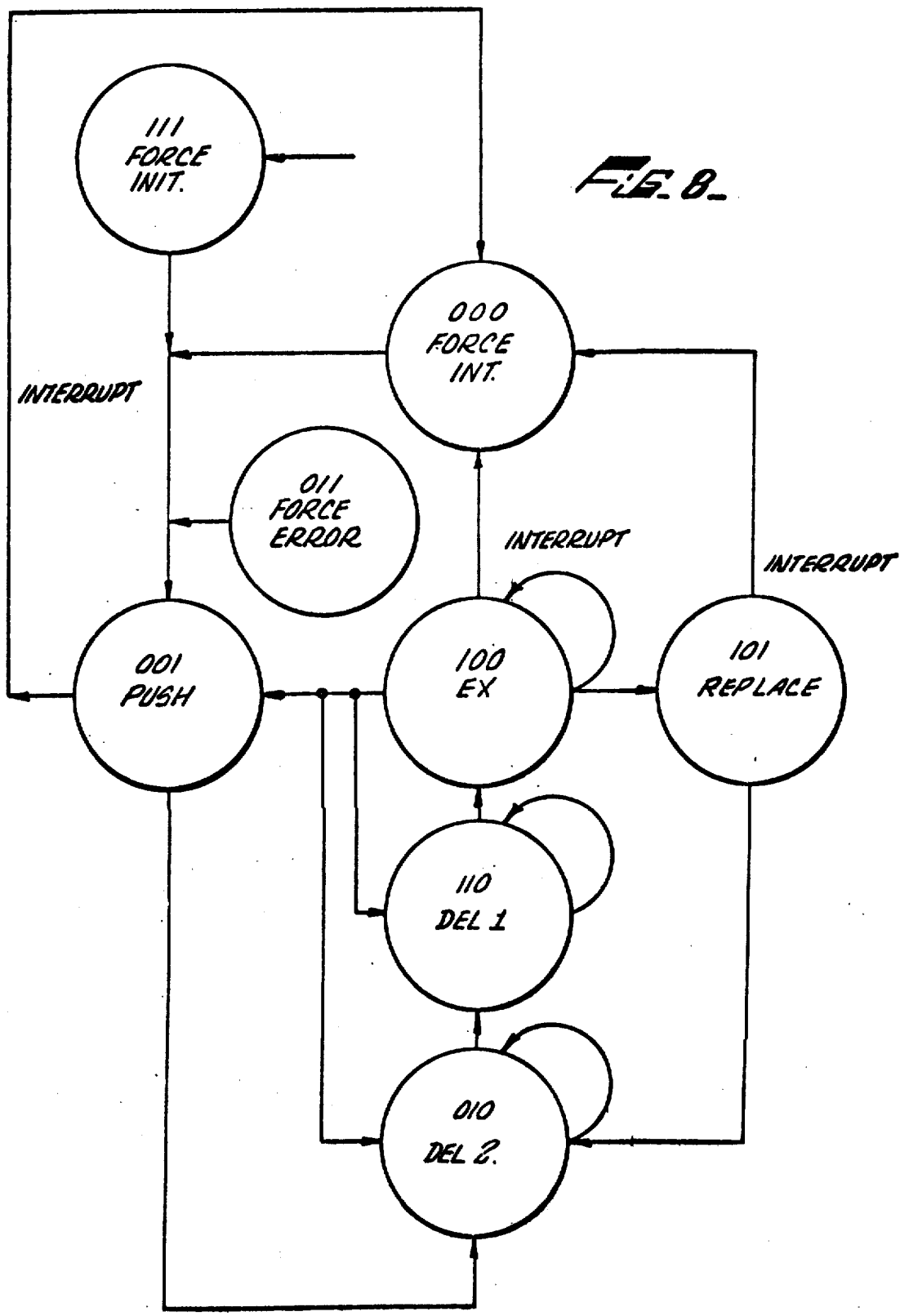
FIG. 8 is a state diagram illustrating the relation between the various machine states of the present invention.

There are eight different machine states and the relation between those states is illustrated in FIG. 8. These respective states are denoted as force-initiate (111), force-interrupt (000), force-error (011), push (001), replace (101), execute (100), delay 1 (110) and delay 2 (010). The conditions under which each of the states is entered and the function of that state will now be discussed.

The function of the push state (001) in the processor is to manipulate the micro memory address register and associated stack such that subroutine jump addresses and interrupt return addresses are saved in the stack. The conditions for entry to the push state exist when the current micro instruction is a satisfied subroutine jump in count time 1 of the execute state, or else when a force-interrupt condition, a force-initialized condition or a force-error condition is valid during the current machine cycle.

The function of the replace state (101) is to cause unconditional jump addresses and satisfied conditional jump addresses to be loaded from the load register in the micro memory address stack to the micro memory address register. The conditions for entry to the replace state exists when the current micro instruction is a satisfied jump but not a subroutine or a subroutine return and when the current micro instruction is in count time 1 of the execute state.

The force-interrupt state is to cause a force micro program routine address to be loaded into the micro memory address stack. When an interrupt occurs, condition for entry to the force-interrupt state exists when the current state machine is either push or replace; the current micro instruction is a non jump TMS load in count time 1 of the execute state and the contents of the micro buffer are invalid; the current micro instruction is a satisfied conditional read in the execute state but not in count time 1 of that state and again the contents of the micro buffer have been declared invalid; the current micro instruction is a subroutine return in count time 1 of the execute state.

The force-initialize state (111) is entered upon receipt by the processor of a power on signal. The force-error state (011) is entered upon detection of a parity fault from memory when a memory enable line to the processor has indicated that a memory access has been granted to the processor.

The delay 2 state is provided in order to permit the fetching of a micro instruction in the micro portion of memory and to be loaded into the micro buffer if the previous micro instruction just executed is either a satisfied conditional jump, an unconditional jump, a subroutine jump, or subroutine return. The delay 2 state may only be entered if no interrupt is present and when the current state of the micro processor is either push or replace; the current micro instruction is a subroutine return in the execute state; the current micro instruction is a satisfied conditional read in the execute state but not in count time 1 of that state.

The delay 1 state (110) is provided for two purposes. The more important purpose is to cause the micro instruction currently in the micro buffer to be brought forward to the control memory and the corresponding control instruction to be brought into the control buffer prior to execution. The remaining application of the delay 1 state is necessitated by the memory access time on read micro instructions since it is impossible for a character in memory, addressed by one of the MAR registers, to be accessed and brought out to the processor storage registers in the same cycle. In this case, the delay 1 state is provided to access the first character required in any memory read micro instruction prior to the processor entry to the execute state.

The execute state (100) controls all transfers of data within the processor other than those stack manipulations controlled by the replace, force, and push state.

A regular micro instruction not requiring memory access can be executed in one clock time and no associated delays are required. A memory write micro instruction requires a one clock delay after the execution has been terminated. A memory read instruction requires a one clock time delay before execution, and a one clock time delay after execution. A literal micro instruction requires a one clock time delay after execution has been terminated to allow for fetch of the next micro syllable as was described above.

A jump unconditional micro instruction and a jump conditional satisfied micro instruction require two clock time delays after execution has been terminated. A jump conditional unsatisfied micro instruction requires one clock time delay after execution has been terminated. A memory read conditional terminate micro instruction requires a one clock time delay before execution is initiated and a two clock time delay after execution has been completed. The input/output interface of the processor, as shown in FIG. 2, comprise input/output data bus 23a, input/output address register 41, input/output request bus 42, input/output address bus 43 and mask register 49. These facilities can service eight channels having bi-directional capability and program controlled priority. All transfers through an input/output channel are under processor control. Control parameters, data, and identification and status requests, may be transmitted from a processor to an input/output channel controller; and status, identification, and data are passed from the controller to the processor. All data transfers initiated by a processor access the processor via an input/output interrupt request; control, identification and status information may be transferred only by a processor command. Using the data interrupt request facility, all of the eight input/output channels may operate concurrently.

The input/output data bus 23a has associated with it a number of service lines which include a channel address line, a channel request line and input/output execute line, a control line, a two-phase clock line, a power-on line, and a direction line. The data bus itself consists of eight bi-directional data lines.

A unique channel address line is provided for each channel addressed by the processor. An appropriate line is raised any time communication with a particular channel is required. When a particular channel address line has been raised, that channel's data bus may be connected to the processor's data bus 23a.

A channel request line is provided between each channel and processor, a particular channel request line being raised when its corresponding channel requires service. All eight input/output channel request lines are logically "OR"ed together to form an input/output interrupt request to the processor machine state control 39 (in FIG. 2). Requests are interrogated by the processor to determine channel priority. A channel's request line is used by the input/output device controller to inform the processor that, a data command from the processor has been satisfied and data transfers are requested, a device has gone "not ready" while selected, or a device has gone "ready" while deselected. Function of the request line in this manner permits a processor to perform other processing tasks after passing a command to the input/output controller and while waiting for the controller to request servicing as a result of the command.

Figure 12:
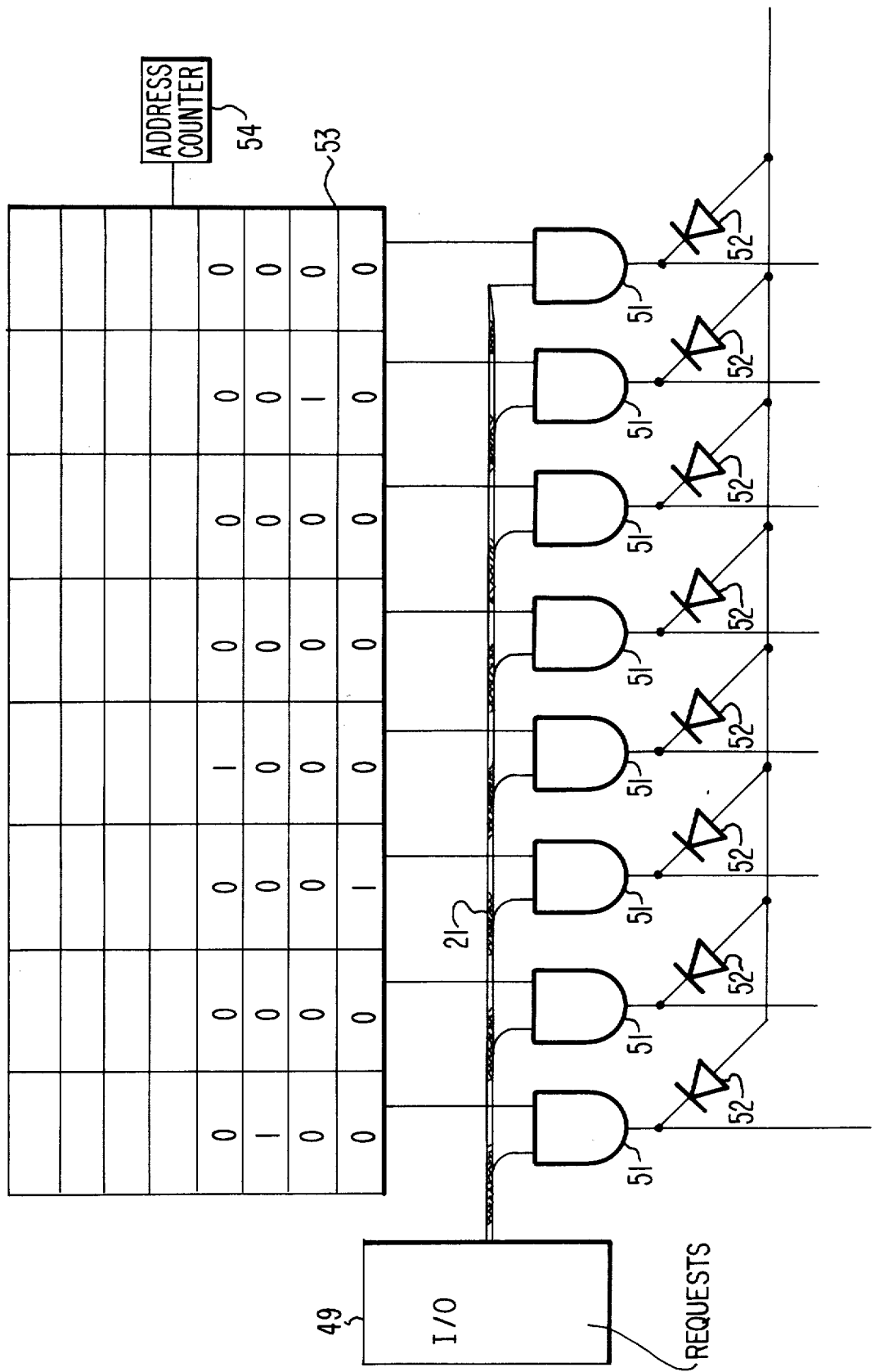
FIG. 12 is a representation or a comparison circuit that may be employed by the present invention.

The input/output interrupt priority resolution feature of the present invention will now be described in relation to FIG. 12. As was described above, each of the channel request lines may be raised to indicate a service request and the respective request signals are presented to mark register 49 of FIGS. 2 and 12. The existence of any such signal causes machine state control 39 (in FIG. 2) to interrupt the routine (including an input/output command) currently being run by the processor and to call a subroutine to interrogate the various request signals and determine which has highest priority. In FIG. 12, the various request signals are transferred from register 49 to corresponding AND gates 51 according to the respective bit position of the signals in register 49. While these signals are presented to the AND gates, a sequence of words are fetched from a priority order table in memory 53 for comparison.

As indicated in FIG. 12, each of the fetched words contains only one 1 bit, the remaining bits being zero (0). The bit position of the 1 bit corresponds to a particular input/output channel request line, and the order in which the words are fetched corresponds to the order of priority assigned to each of the channels. Assuming the bit positions in FIG. 12 are left justified, i.e. channel order runs from left to right, the highest priority (lowest word address in FIG. 12) is assigned to the third channel, the second highest priority is assigned to the seventh channel, the third highest priority is assigned to the first channel and so forth.

As exemplary pattern of request signals in register 49 could be 11010111. When the processor has been interrupted and the request interrogation invoked, address counter 54 in FIG. 12 will fetch the lowest word from memory 53 for comparison with the contents of register 49 by means of AND gates 51. With the exemplary pattern given above, no comparison will occur and there will be no output signals from AND gates 51. Thus address counter 54 is incremented to fetch the next lowest word from memory 53. A comparison now occurs and an output signal is provided by the seventh (left justified) AND gate 51. (Only one AND gate will have an output signal.) This signal is transmitted by the corresponding diode 52 to machine state control 39 (in FIG. 2) to halt the subroutine, and also causes the address line of the corresponding channel to be raised to connect that channel data bus to processor data bus 23a (in FIG. 2).

In lieu of the circuitry of FIG. 12, the comparison function of AND gates 51 can be performed by function unit 20 of FIG. 2 and the priority order table can be stored in memory 11 of FIG. 1. In either situation, the conditional terminate micro instruction, described above, is employed to initiate the memory fetch sequence which is only terminated when a comparision is achieved.

The remaining service lines of input/output data bus 23a in FIG. 2 will now be described. The input/output execute line controls all transfers of information and data between the processor and input/output controller. This line remains raised during the execution by a micro instruction of any information transfer in an input/output channel and acts as an enable signal to the system transfer clocks.

The control line of the input/output interface is raised by the processor to indicate to the addressed channel that command or control information is being transferred through the channel.

The power-on line is employed to initialize the conditions of a particular device on each input/output channel.

The direction line is used to indicate the current data transfer direction on the bi-directional data lines. When that direction is into the processor, and the above-described control line is raised, a primary status character of an input/output device is transferred to the processor.

Five types of operations may be performed across the input/output interface. They are respectively called "interrogate status", "electronic command I", "electronic command II", "peripheral timing sensitive" command and "data transfer".

The interrogate status command operates in an unusual manner on the system in that status information collected into a single byte by a peripheral controller may be transferred to the processor or memory during the same cycle as an interrogate request action is performed by the processor. A status character in a peripheral controller is addressed by any processor micro instruction causing the above-described control line to be raised and the direction line to be lowered across the interface between the processor and the peripheral controller.

The electronic command I is of the type where there is not immediately succeeding data transfer as a result. This first type of "electronic command" causes an action in the peripheral controller which does not prepare the controller for a data transfer in the next cycle. Examples of this type are "select to read", "set mode", and "deselect".

The electronic command II is one where the next input/output transfer to or from the command peripheral device must involve a processor register which is conditioned by this command. This type of command causes a register in a peripheral controller to be preconditioned such that the next input/output data transfer to the controller either writes data to that register or reads data from that register to the processor memory. A data transfer succeeding the command may occur after a number of cycles' delay. The processor insures that any data requests as the result of select to read or "select to write" commands are inhibited until the data transfer condition by an electronic command II type is executed.

The "peripheral timing sensitive" type of command may be executed in two ways. One of these ways is by including that command in the data stream to a peripheral. In this case, a command is treated as data by the peripheral controller and termination of the command is signified to the processor by the peripheral causing its request line to be raised. The second manner in which this type of command can be used is by using the above-described control and direction line to indicate a control character transfer.

The "data transfer" type of command includes select to read and select to write commands to control information transfer. The select to read command initiates transfer of data being read from the peripheral. The select to write initiates the transfer data to be written to a peripheral from the processor. Controllers may be defined as block transfer or single character transfer controllers. When a block or character transfer is required after selection, the peripheral controller raises its request line to the processor. The processor responds to this request by lowering the control line (described above) and raising the input/output execute line (described above) for the duration of the transfer. The direction line associated with data bus 23a (see FIG. 2) is lowered for the reading of data from the peripheral and is raised for the writing of data to the peripheral from the processor. The processor signifies the end of a data transfer by placing a "response" code on the input/output data bus after the transfer of the last character in a block. The peripheral controller must then lower its request line until it is capable of further data transfers.

Information transfers under control of the "peripheral timing sensitive" and "data transfer" type of commands are subject to interrupt control in the processor. The interrupt control exists in the machine state control 39 of FIG. 2 and provides the capability of accepting eight bi-directional input/output channel requests and enabling their input to the processor by the generation of an "interrupt enable" flag or signal. When the interrupt enable flag has been set at a logical 1, it permits any request from a peripheral to take control of the micro processor by causing the machine state control 39 in FIG. 2 to enter the force state as was described above in regard to the various machine states. While the processor is in the force state, the interrupt enable flag is reset to a logical 0 so that no further interrupts may be generated while the processor is servicing the first interrupt. After servicing the interrupt, the processor must set the interrupt enable flag to a logical 1 to again permit channel requests to be serviced. This is achieved by the processor programming an interrupt return micro instruction which sets the interrupt enable flag and restores micro program control to the micro instruction succeeding the one being executed when the interrupt occurred. The interrupt enable flag may also be set programmatically to a logical 0 by use of a special subroutine jump micro instruction.

The function of the force interrupt state (described above) is to load a fixed address, the start address of the peripheral handler routines, into the micro memory address stack and to copy the normal carry flag to the interrupt carry flag. On an interrupt return micro instruction, the interrupt carry is copied to the jump carry flag.

EPILOGUE

A system and method employed by that system have been described which can accommodate a number of peripheral devices which can operate simultaneously and interrupt the processor according to the priority assigned to each device. Furthermore, the system and method employed thereby are designed to be cost competitive with other small general purpose processing systems and special purpose computers, and also to be performance competitive with medium size micro program systems. Variable micro program systems maintain an advantage over non-micro program systems in their ability to readily interpret the plurality of different higher level program languages through the implementation thereof by different strings of micro code or micro instructions.

To achieve the above-stated design goals, the present system and the method employed thereby are adapted to employ plural levels of subinstruction sets to implement the higher level instruction sets representing the different programs. Since the different levels of subinstruction sets are stored in different memories, the corresponding instructions can be fetched from their respective memories in an overlapped and also parallel manner. This provides to the system of the present invention parallel subinstruction flow streams.

The respective levels of substruction sets are the conventional micro instructions and also control instructions, the latter of which are the sets of control signals required to condition the various gates for data transfers and other operations. The format of the micro instruction can be varied to comprise different numbers of basic syllables which are then fetched sequentially from the micro memory to form the desired micro instruction. In this manner, redundant storage requirements of the micro instruction memory are considerably reduced. Other features of the present invention which have been disclosed include the provision in the machine state control to delay subsequent micro instruction execution so as, for example, to allow a single micro instruction to control a large number of data transfers from the memory and within the processor. The system is also provided with the feature of being able to conditionally halt the execution of the micro instruction calling for such large numbers of data transfers upon the occurrence of the appropriately specified condition. This latter feature can be employed to control input/output interrupt priority resolution by calling forth priority designation signals in a sequence according to their priority and to halt that sequence when a service request having highest priority has been found.

While but one embodiment of the present invention has been described and illustrated, it will be obvious to one skilled in the art that changes and modifications may be made therein without departing from the spirit and scope of the invention as claimed.

What is claimed is:

1. A data processing system having a first memory, a plurality of peripheral devices each having a service request line and a processor, said processor comprising:
   a function unit to perform logical operations on data;
   a control memory coupled to said function unit and containing control instructions to control data transfers to and from said function unit;
   micro instruction fetch means coupled to said first memory to fetch a sequence of micro instructions;
   control instruction fetch means coupled to said micro instruction fetch means and to said control memory to fetch individual control instructions in response to the respective micro instructions;
   priority resolution means connected to said service request lines, said function unit and said first memory to receive sets of signals from said first memory for comparison by said function unit with all of said service request line signals, each set of signals from said first memory indicating that only one particular peripheral divice is to be serviced; and signal fetch means coupled to said first memory, said control memory and to said priority resolution means to fetch said sets of signals in a sequence, said sequence representing priority levels of the respective peripheral devices from the highest priority to the lowest priority, said sequence fetching being under control of a control instruction.

2. A system according to claim 1 including:

means coupled to said function unit and to said signal fetch means to halt said fetching when one of said sets of signals has a comparison to the service request line signal representing a peripheral device having the highest priority of such peripheral devices currently requesting service.

3. A system according to claim 2 including:

means to couple said processor to said peripheral device having the highest priority of such peripheral devices currently requesting service for data transfer therebetween.

4. A data processing system having a first memory, a plurality of peripheral devices each having a service request line and a processor, said processor comprising:

a function unit to perform logical operations on data;

micro instruction fetch means coupled to said first memory to fetch individual micro instructions therefrom;

priority resolution means connected to said service request lines, said function unit and said first memory to receive sets of signals from said first memory for comparison by said function unit with all of said service request line signals, each set of signals from said first memory indicating that only one particular peripheral device is to be serviced; and signal fetch means coupled to said first memory, and to said priority resolution means to fetch said sets of signals in a sequence, said sequence representing priority levels of the respective peripheral devices from the highest priority to the lowest priority, said sequence fetching being under the control of a micro instruction.

5. A system according to claim 4 including:

means coupled to said function unit and to said signal fetch means to halt said fetching when one of said sets of signals has a comparison to the service request line signal representing a peripheral device having the highest priority of such peripheral devices currently requesting service.

6. A system according to claim 5 including:

means to couple said processor to said peripheral device having the highest priority of such peripheral devices currently requesting service for data transfer therebetween.

7. A data processing system comprising:

a data processor having a priority resolution means; and a plurality of peripheral devices each having a service request line coupled to said priority resolution means;

said priority resolution means including a memory to store sets of signals each set indicating that only one particular peripheral device is to be serviced, and fetching means to fetch said sets of signals for comparison with concurrent signals on all of said service request lines, said sets of signals being fetched in a sequence representing priority levels of the respective peripheral devices from the highest priority to the lowest priority.

8. A system according to claim 7 wherein:

said processor further includes gating means to gate each set of signals with said concurrent signals to produce output signals thereof as the AND function of said sets of signals and said concurrent signals.

9. A system according to claim 8 including:

means to couple one of said peripheral devices to said processor for data transfer in response to the output signals produced by said gating means.

* * * * *

UNITED STATES PATENT OFFICE
CERTIFICATE OF CORRECTION

Patent No. 4,005,391          Dated    1-25-77

Inventor(s) Alastair George MacPherson

It is certified that error appears in the above-identified patent and that said Letters Patent are hereby corrected as shown below:

Col. 1, line 46, change "large" to read --larger--.

Col. 1, line 59, change "adopted" to read --adapted--.

Col. 3, line 61, change "amd" to read --and--.

Col. 7, line 56, change "making" to read --masking--.

Col. 18, line 22, change "substruction" to read --subinstruction--

Signed and Sealed this

Nineteenth Day of April 1977

[SEAL]

Attest:

RUTH C. MASON
*Attesting Officer*

C. MARSHALL DANN
*Commissioner of Patents and Trademarks*